(12) United States Patent
Ohno

(10) Patent No.: US 8,061,885 B2
(45) Date of Patent: *Nov. 22, 2011

(54) PLANAR ILLUMINATION DEVICE

(75) Inventor: Yasuo Ohno, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,604

(22) Filed: Aug. 9, 2010

(65) Prior Publication Data

US 2010/0302806 A1    Dec. 2, 2010

Related U.S. Application Data

(63) Continuation of application No. 11/919,138, filed as application No. PCT/JP2006/302846 on Feb. 17, 2006.

(30) Foreign Application Priority Data

Apr. 26, 2005    (JP) .................. 2005-128488

(51) Int. Cl.
F21V 7/04    (2006.01)

(52) U.S. Cl. .................. 362/633; 362/612; 362/632

(58) Field of Classification Search .................. 362/612, 362/632, 633, 26, 27
See application file for complete search history.

(56) References Cited

U.S. PATENT DOCUMENTS

| | | | |
|---|---|---|---|
| 6,046,785 A | 4/2000 | Won | |
| 6,055,029 A | 4/2000 | Kurihara et al. | |
| 6,992,736 B2 | 1/2006 | Saito et al. | |
| 7,327,414 B2 | 2/2008 | Won et al. | |
| 2003/0030765 A1 | 2/2003 | Hayashi et al. | |

FOREIGN PATENT DOCUMENTS

| | | |
|---|---|---|
| JP | A-09-282919 | 10/1997 |
| JP | A-2002-156632 | 5/2002 |
| JP | A-2003-215546 | 7/2003 |
| JP | A-2003-338214 | 11/2003 |
| JP | A-2004-186004 | 7/2004 |
| JP | A-2004-241282 | 8/2004 |

Primary Examiner — David Crowe
(74) Attorney, Agent, or Firm — Oliff & Berridge, PLC

(57) ABSTRACT

A planar illumination device comprises a light guide plate, a point-like light source arranged on an incoming-light face of the light guide plate, an inner frame formed substantially in a U-shape on a top view, and an outer frame having a seat portion and side walls wherein the light guide plate is accommodated in the inner frame and mounted on the seat portion of the outer frame, while the point-like light source is arranged along the incoming-light face of the light guide plate and held between the incoming-light face and the side wall of the outer frame. At the inner frame, an elastic action portion which is elastically deformed so as to make a partial contact with the outer frame and energizes the light guide plate toward the point-like light source is provided.

4 Claims, 2 Drawing Sheets

(a)

(b)

PLANAR ILLUMINATION DEVICE

This is a Continuation of application Ser. No. 11/919,138 filed Nov. 13, 2007, which in turn is a National Stage of PCT/JP2006/302846 filed Feb. 17, 2006, and which claims priority to Japanese Application No. 2005-128488 filed on Apr. 26, 2005. The disclosure of the prior applications is hereby incorporated by reference herein in its entirety.

TECHNICAL FIELD

The present invention relates to a side-light-type planar illumination device and particularly to a planar illumination device used as illuminating means of a liquid crystal display device.

BACKGROUND ART

As an auxiliary light source for a liquid crystal display device used for a cellular phone or the like, a side-light type planar illumination device in which a primary light source is arranged on a side end face of a light guide plate is mainly used (hereinafter the side end face on which the primary light source is arranged is also called as a incoming-light face). As the primary light source of a side-light-type planar illumination device, a cold-cathode tube lamp has been used, but currently, a point-like light source such as a white LED which is more in impact resistance than the cold-cathode tube lamp is used in many cases. Application fields of the planar illumination device using such a point-like light source tend to expand, and application not only a small-sized liquid crystal display device used in a cellular phone or the like but also as an auxiliary light source of a liquid crystal display device used in an in-vehicle navigator with a relatively large display size, for example, is being discussed.

In order to respond to the expansion of an illumination area, various trials are made for increase of an outgoing light amount from the primary light source and efficient use of the outgoing light. For example, the increase of the outgoing light amount is promoted through increase of the number of point-like light sources arranged on one side end face of a light guide plate, arrangement of the point-like light source on a plurality of side end faces of the light guide plate or increase of the outgoing light amount per point-like light source by increasing an electric current to be supplied to the point-like light source.

On the other hand, increase of the point-like light sources constituting the primary light source or increase of the electric current to be supplied to each of the point-like light sources accompanies a problem of increase in a heat amount generated from the primary light source, leading to rise of an ambient temperature and lowered light emitting efficiency of the point-like light source. Also, when heat from the primary light source is transmitted to the light guide plate, positional displacement between the light guide plate and the point-like light source is induced by expansion of the light guide plate, which results in a problem that efficient use of the outgoing light is prevented and also causes fluctuation in illumination brightness of the planar illumination device. Moreover, if the light guide plate is accommodated in a frame, such nonconformity might occur that the light guide plate is deformed due to a difference in heat expansion coefficient between the light guide plate and the frame.

In order to efficiently radiate heat generated from the point-like light source, such a planar illumination device is proposed in which the light guide plate and the point-like light source are accommodated in a metal chassis and radiation performance of the point-like light source is improved by bringing the point-like light source into direct contact with the metal chassis (See Patent Document 1, for example). Also, a planar illumination device 100 in which an elastic action portion 120 is provided at a frame 102 as a method for restraining nonconformity caused by the heat expansion of the light guide plate shown in FIG. 3 is proposed (See Patent Document 2, for example).

In the planar illumination device 100, the elastic action portion 120 comprises a thin beam portion 122 capable of elastic deformation formed by providing a thickness reducing hole 123 on a side wall 102b of the frame 102 and a projection portion 121 projecting from the center of the beam portion 122. The frame 102 accommodates a light guide plate 103 and a fluorescent lamp 105 held by a lamp holder 104, and the light guide plate 103 is arranged so that the projection portion 121 of the elastic action portion 120 is brought into contact with a side end face (terminal face) 103b on the side opposite a side end face (incoming-light face) 103a on which the fluorescent lamp 105 is arranged. By holding the lamp holder 104 between the incoming-light face 103a and the side wall 102a of the frame 102 opposite the incoming-light face 103a, the fluorescent lamp 105 is arranged along the incoming-light face 103a of the light guide plate 103. In the planar illumination device 100, with the above configuration, the light guide plate 103 is energized to the fluorescent lamp 105 side with an elastic force F from the elastic action portion 120 and the deformation of the light guide plate 103 is absorbed.

Patent Document 1: Japanese Unexamined Patent Application Publication No. 2004-186004 (paragraphs [0035] to [0037], FIG. 3)

Patent Document 2: Japanese Unexamined Patent Application Publication No. 2003-338214 (paragraphs [0016] to [0017], FIG. 1)

DISCLOSURE OF INVENTION

However, since the planar illumination device 100 shown in FIG. 3 has the projection portion 121 of the elastic action portion 120 brought into contact with the terminal face 103b of the light guide plate 103, a gap g exists between the terminal face 103b of the light guide plate 103 and the side wall 102b of the frame 102 opposite the terminal face 103b. Therefore, light leaking from the terminal end face 103b cannot be efficiently reflected to the light guide plate 103, which causes a problem of lowered use efficiency of the light. Also, in the planar illumination device 100, the face of the side wall 102b of the frame 102 opposite the terminal face 103b of the light guide plate 103 has configurations different between the region in which the elastic action portion 120 is formed and the other regions. That is, the region where the elastic action portion 120 of the side wall 102b is formed generally comprises a recess-state curved face formed by flexural deformation of the beam portion 122 and the surface of the projection portion 121 present at its center, which is different from a flat plane constituting the other regions in the side wall 102b, and in addition, even if the side wall 102b and the terminal face 103b of the light guide plate 103 are brought into substantially close contact with each other according to expansion or the like of the light guide plate 103, for example, on both sides of the projection portion 120, there is no direct contact with the terminal face 103b but a portion with an air layer remains therebetween. Such a difference in plane configuration might cause a difference in light reflectance between both and unevenness in brightness of the planar illumination device.

Moreover, the configuration described in Patent Document 1 presumes use of the fluorescent lamp 105 as the primary light source, and no particular consideration is given to its radiation performance. On the other hand, in order to use the point-like light source such as the white LED as the primary light source and to achieve its higher brightness, it is preferable to efficiently radiate the heat generated from the point-like light source by bringing the point-like light source into direct contact with the metal chassis as described in Patent Document 1, for example, but the planar illumination device described in Patent Document 1 does not have an action to stably maintain bonding with the light guide plate against expansion and contraction due to heat expansion or the like, and there is room for improvement in that regard.

The present invention was made in view of the above problems and has an object to provide a planar illumination device capable of efficiently radiating heat from the point-like light source and stably maintaining bonding between the light guide plate and the point-like light source by absorbing expansion and contraction of the light guide plate.

In order to achieve the above object, the planar illumination device according to the present invention comprising a light guide plate, a point-like light source arranged on a side end face of the light guide plate, and a frame holding them, the frame comprising an inner frame formed substantially in the U-shape on a top view and an outer frame having a plane-state seat portion and a side wall installed upright on an outer edge portion of the seat portion and accommodating the inner frame, the light guide plate being accommodated in the inner frame and mounted on the seat portion together with the inner frame, the point-like light source being held between a side end face on an open side of the inner frame in the light guide plate and the side wall of the outer frame opposite the side end face, and the inner frame being provided with an elastic action portion which is brought into contact with the side wall of the outer frame and elastically deformed so as to energize the light guide plate toward the point-like light source side.

According to the present invention, the frame holding the light guide plate and the point-like light source is in the double structure of the U-shaped inner frame accommodating the light guide plate and the outer frame accommodating the inner frame, while the point-like light source is held between the side end face on the open side of the inner frame in the light guide plate and the side wall of the outer frame opposite the side end face so as to be arranged in direct contact with the outer frame. Thus, by forming the outer frame from a material having heat conductivity higher than that of the inner frame, the heat generated from the point-like light source can be efficiently radiated, which contributes to higher brightness of the planar illumination device.

Moreover, since the elastic action portion energizing the inner frame toward the point-like light source is provided at the inner frame in the present invention, bonding efficiency between the light guide plate accommodated in the inner frame and the point-like light source can be improved, and even if the light guide plate is expanded/contracted in a direction crossing the incoming-light face of the light guide plate (vertical direction), the expansion/contraction is absorbed by elastic deformation of the elastic action portion and the bonding between the light guide plate and the point-like light source can be stably maintained. Also, since the elastic action portion according to the present invention is elastically deformed upon contact with the outer frame, the face opposite the side end face of the light guide plate in three sides constituting the inner frame can be configured as an even flat face and each of the side end faces of the light guide plate excluding the incoming-light face can be accommodated in close contact with those three sides. Therefore, light leaking from the side end face of the light guide plate can be efficiently returned to the light guide plate without unevenness in the brightness.

Also, since the inner frame according to the present invention is formed in the U-shape and the point-like light source is arranged with the side end face on the open side of the inner frame in the light guide plate as the incoming-light face, even if the light guide plate is expanded/contracted in a direction parallel to the incoming-light face (horizontal direction), an interval between opposing two sides in the three sides forming the U-shape can be deformed flexibly following the deformation of the light guide plate by the elasticity of the inner frame itself.

As a mode of the present invention, the elastic action portion according to the present invention comprises a thin beam portion provided at a side opposite the open side of the inner frame and a projection portion projecting outward of the inner frame from substantially the center of the beam portion, and the inner frame is accommodated in the outer frame by bringing the projection portion into contact with the side wall of the outer frame.

By this configuration, the elastic action portion which is suitable for elastic deformation upon contact with the side wall of the outer frame and energizing the light guide plate toward the point-like light source can be easily formed integrally with the inner frame.

Preferably, the elastic action portion is provided at the opposing two sides of the inner frame, and by providing the elastic action portion at three sides constituting the inner frame, the inner frame can be stably held at the outer frame and the deformation in the 2 axial directions (the above vertical direction and horizontal direction) of the light guide plate can be both absorbed.

Also, as a mode of the present invention, the elastic action portion according to the present invention comprises a cantilever beam provided at opposing sides of the inner frame, respectively, and extending with inclination from one side of the inner frame toward a free end of the open side of the inner frame so as to expand outward of the inner frame, and the inner frame may be accommodated in the outer frame by bringing the respective cantilever beams into contact with an upper end of each side wall opposite the opposing two sides of the inner frame in the outer frame. By constituting the elastic action portion according to the present invention as above, the elastic action in the above 2 axial directions with respect to the light guide plate can be realized by the pair of elastic action portions provided at two opposing sides, respectively, of the inner frame.

Also, the inner frame is formed from a white resin material, while the outer frame is preferably formed from a heat conductive metal material, by which the elastic action portion according to the present invention can be easily formed integrally, and the planar illumination device can be realized, provided with the inner frame capable of efficiently reflecting the leakage light from the side end face of the light guide plate and returning it to the light guide plate and the outer frame excellent in radiation performance of the heat generated from the point-like light source.

Since the present invention is configured as above, the heat from the point-like light source can be efficiently radiated and the bonding between the light guide plate and the point-like light source can be stably maintained by absorbing the expansion/contraction of the light guide plate. Thus, higher and stable brightness of the planar illumination device can be achieved.

BRIEF DESCRIPTION OF THE DRAWINGS

FIG. 1 is a view illustrating an essential part of a planar illumination device in a first embodiment of the present invention, in which FIG. 1A is a top view and FIG. 1B is a side view illustrating a part as an A-A section;

Figure 1:
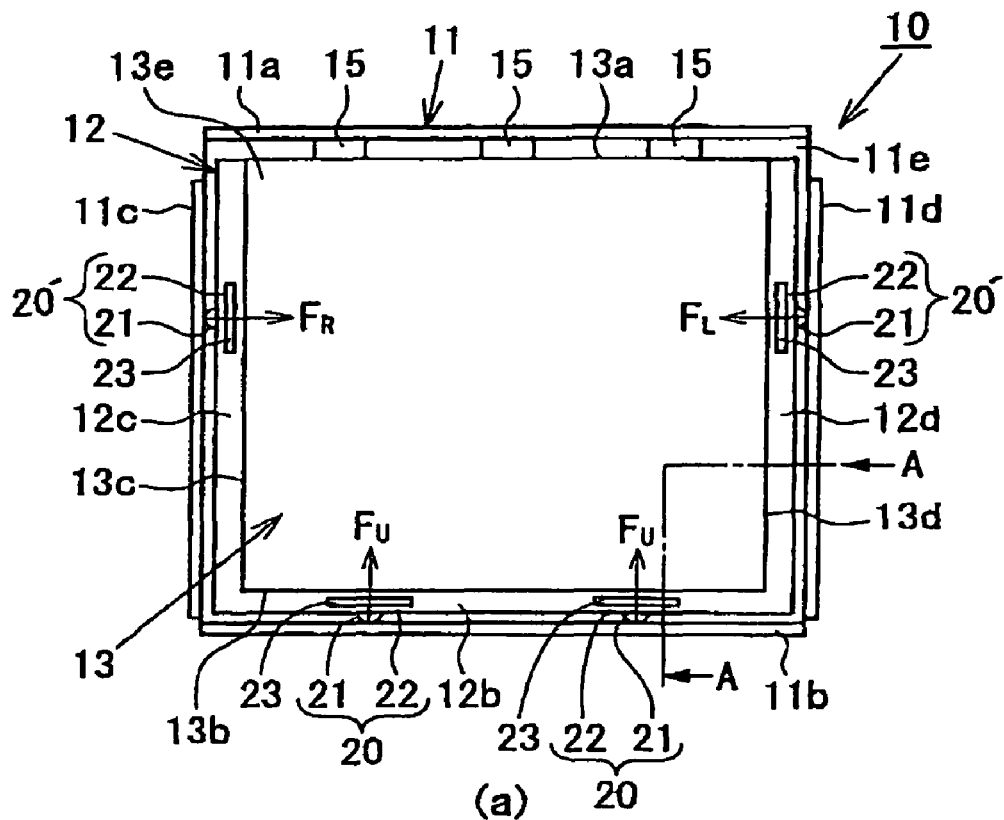
Figure 1:
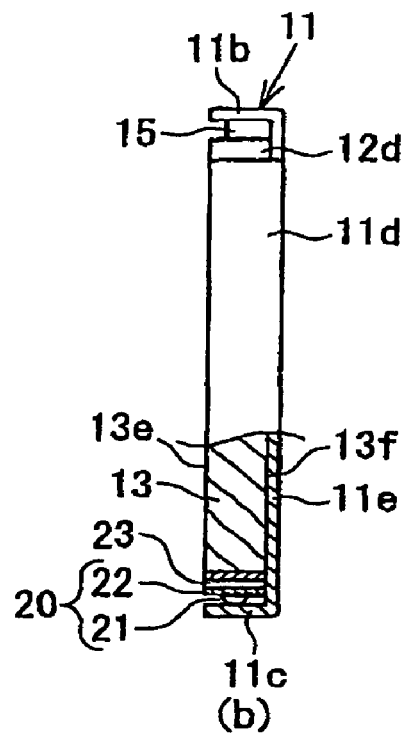

REFERENCE NUMERALS 10, 30 planar illumination device
11 outer frame
12, 32 inner frame
13 light guide plate
15 point-like light source
20 elastic action portion
21 projection portion
22 beam portion
33 elastic action portion (cantilever beam)

BEST MODE FOR CARRYING OUT THE INVENTION

An embodiment of the present invention will be described below referring to the attached drawings, but each drawing is for explanation and does not necessarily reflect actual shapes or dimensions accurately.

FIG. 1 is a view illustrating an essential part of a planar illumination device 10 in a first embodiment of the present invention, in which FIG. 1A is a top view and FIG. 1B is a side view illustrating a part as an A-A section. The planar illumination device 10 in this embodiment comprises a light guide plate 13, a point-like light source 15 arranged on a side end face 13a of the light guide plate 13, and frames 11, 12 holding them, and the frame comprises an inner frame 12 formed in the U-shape on a top view and an outer frame 11 having a plane-state seat portion 11e and side walls 11a, 11b, 11c, 11d installed upright on an outer edge portion of the seat portion 11e. In the planar illumination device 10, the light guide plate 13 is accommodated in the inner frame 12 and mounted on the seat portion 11e of the outer frame 11 together with the inner frame 12, and the point-like light sources 15 are arranged along the side end face (incoming-light face) 13a on the open side of the inner frame 12 in the light guide plate 13 and are held between the incoming-light face 13a and the side wall 11a of the outer frame 11 opposite the incoming-light face 13a. Also, in this embodiment, elastic action portions 20, 20' are provided at three sides 12b, 12c, 12d constituting the inner frame 12 substantially in the U-shape, and detailed configuration and actions of the elastic action portions 20, 20' will be described later.

Here, the light guide plate 13 is a plate-state light guide body formed by molding a transparent resin such as an acrylic resin or a polycarbonate resin into a substantially rectangular shape, and the light incident from the incoming-light face 13a is evenly emitted from the surface 13a while it is propagated into the light guide plate 13 with the upper face 13e as the light emitting face and the lower face 13f as the reflecting face.

Also, the point-like light source 15 is made from a white LED, for example, and is arranged with the light emitting face toward the incoming-light face 13a of the light guide plate 13. Also, though not shown, the point-like light sources 15 are mounted on a circuit board such as a flexible print circuit board and the circuit board may be, for example, fastened to the upper face 13e or the lower face 13f of the light guide plate 13 or the side wall 11a of the outer frame 11.

In this embodiment, the inner frame 12 has two opposing sides 12c, 12d and the bottom side 12b connecting one ends of the two sides and is formed substantially in the U-shape with the side opposite the bottom side 12b as the open side and molded from a white resin such as a polycarbonate resin in which titanium oxide as a white pigment, for example, is mixed. The outer frame 11 is formed from a metal material with high heat conductivity such as aluminum and has the plate-state seat portion 11e and side walls 11a, 11b, 11c, 11d installed upright on the outer edge portion of the seat portion 11e by usual press machining or the like.

The planar illumination device 10 has the double-structured frame constituted by the inner frame 12 and the outer frame 11 as above, and the light guide plate 13 is accommodated in the inner frame 12 with the three side end faces 13b, 13c, 13d, except the incoming-light face 13a, in close contact with the corresponding three sides 12b, 12c, 12d of the inner frame 12, and the integrated light guide plate 13 and the inner frame 12 are accommodated in the outer frame 11 by mounting them onto the seat portion 11e of the outer frame 11. At this time, the side end faces 13b to 13d of the light guide plate 13 and the corresponding inner faces of the sides 12b to 12d of the inner frame 12 are not fastened, and the light guide plate 13 and the inner frame 12 are integrated so that relative displacement between the side end faces 13c, 13d of the light guide plate 13 and the corresponding sides 12c, 12d of the inner frame is possible with expansion/contraction of the light guide plate 13.

In this embodiment, at the bottom side 12b of the inner frame 12, the pair of elastic action portions 20 which are elastically deformed upon contact with the side wall 11b of the outer frame 11 and energizes the inner frame 12 (thus, the light guide plate 13 accommodated integrally in the inner frame 12) toward the point-like light source 15 side are formed, and elastic action portions 20' having the same configuration as the elastic action portions 20 and elastically deformed upon contact with the side walls 11c, 11d of the outer frame 11, respectively, are formed at the opposing two sides 12c, 12d opposite the inner frame 12.

The configuration and actions of the elastic action portions 20, 20' will be described below, in which the direction parallel to the incoming-light face 13a of the light guide plate 13 is referred to as a horizontal direction, the direction crossing the incoming-light face 13a as a vertical direction and the directions in vertical and horizontal directions of the planar illumination device 10 are defined corresponding to the vertical and horizontal directions of the figure on paper as necessary.

First, the elastic action portion 20 comprises a thin beam portion 22 capable of elastic deformation and formed by providing a through hole 23 substantially parallel to the extending direction on the bottom side 12b of the inner frame 12 and a projection portion 21 projecting outward of the inner frame 12 from substantially the center of the beam portion 22. In this embodiment, the inner frame 12 is arranged so that the projection portion 21 of the elastic action portion 20 is brought into contact with the side wall 11b of the outer frame 11 and the beam portion 22 is slightly bent inward of the inner frame 12, by which a drag $F_U$ upward in the vertical direction acts on the bottom side 12b of the inner frame 12 from the side wall 11b as a reaction to the elastic force exerted by the elastic action portion 20 on the side wall 11b. By this drag $F_U$, the inner frame 12 and the light guide plate 13 are energized toward the point-like light source 15 side, and the point-like light source 15 held between the incoming-light face 12a of the light guide plate 13 and the side wall 11a of the outer frame 11 opposite the incoming-light face 12a is favorably and stably bonded to the light guide plate 13, and efficient heat radiation is promoted by contact with the side wall 11a from the heat conductive metal material. Also, even if the light guide plate 13 is expanded/contracted by fluctuation of the ambient temperature or the like, the vertical expansion/contraction is absorbed by the elastic deformation of the beam portion 22 of the elastic action portion 22.

On the other hand, the elastic action portion 20' is formed by providing a structural body similar to the elastic action portion 20 at the opposing two sides 12c, 12d of the inner frame 12 substantially in parallel with their extending direction. In this embodiment, the inner frame 12 is arranged so that the projection portion 21 of the elastic action portion 20' is brought into contact with the side walls 11c, 11d of the outer frame 11 and the beam portion 22 is slightly bent inward of the inner frame 12, by which the drag $F_R$ to the right in the horizontal direction from the side wall 11c acts on the side 12c of the inner frame 12 as a reaction to the elastic force exerted by the elastic action portion 20' on the side wall 11c and the drag $F_L$ to the left in the horizontal direction from the side wall 11d on the side 12d of the inner frame 12 as a reaction to the elastic force exerted by the elastic action portion 20' on the side wall 11d, respectively. The inner frame 12 is stably held by the outer frame by the drag $F_R$ and the drag $F_L$. Also, since the inner frame 12 is formed in the U-shape, the interval between opposing two sides 12c, 12d is varied flexibly following the deformation of the light guide plate 13 by the elasticity of the inner frame 12 itself, and an expansion/contraction component in the horizontal direction in the expansion/contraction of the light guide plate 13 can be absorbed by the elastic deformation of the beam portion 22 of the elastic action portion 20'.

Since the elastic action portions 20, 20' are formed on the outer face side of each of the sides 11b, 11c, 11d constituting the inner frame 12 in the planar illumination device 10 as above, the inner face side of each of the sides 11b, 11c, 11d of the inner frame 12 can be formed in the shape according to each of the side end faces 13b, 13c, 13d of the light guide plate 13 (evenly flat plane, for example), and as mentioned above, each of the side end faces 13b, 13c, 13d can be accommodated in close contact with each of the sides 11b, 11c, 11d of the inner frame 12 so that the leakage light from each of the side end faces 13b, 13c, 13d can be efficiently reflected and returned to the light guide plate 13 without causing unevenness in the brightness.

The elastic action portions 20, 20' are preferably molded integrally with the inner frame 12 made from a white resin and at that time, the thickness and length of the beam portion 22 and the shape/dimension of the through hole 23 or the number, positions or the like of the elastic action portions 20, 20' are appropriately set so that the expansion/contraction of the light guide plate 13 is absorbed and the drags $F_U$, $F_R$, $F_L$ appropriate for the inner frame 12 acts.

Figure 2:
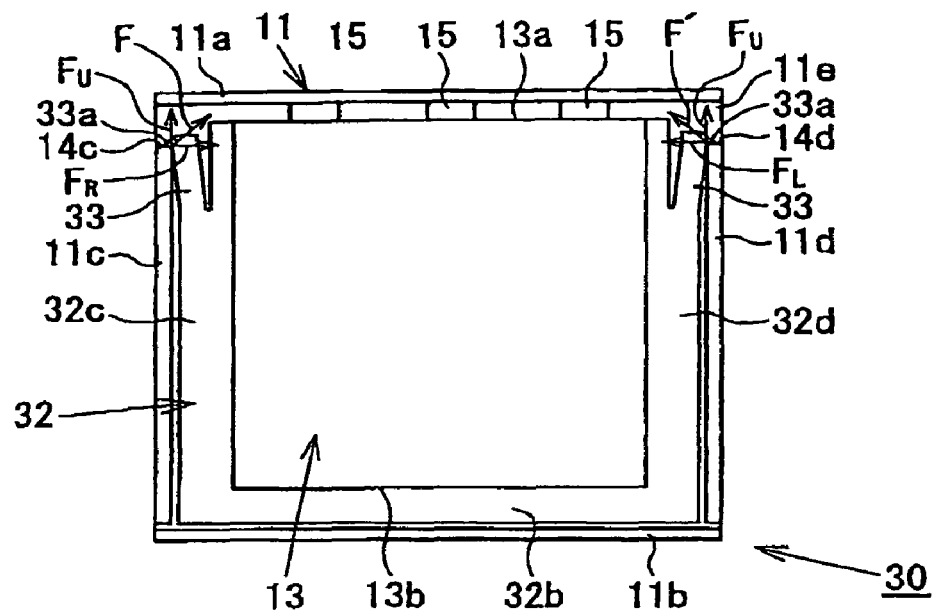
FIG. 2 is a top view illustrating an essential part of the planar illumination device in a second embodiment of the present invention.
Figure 3:
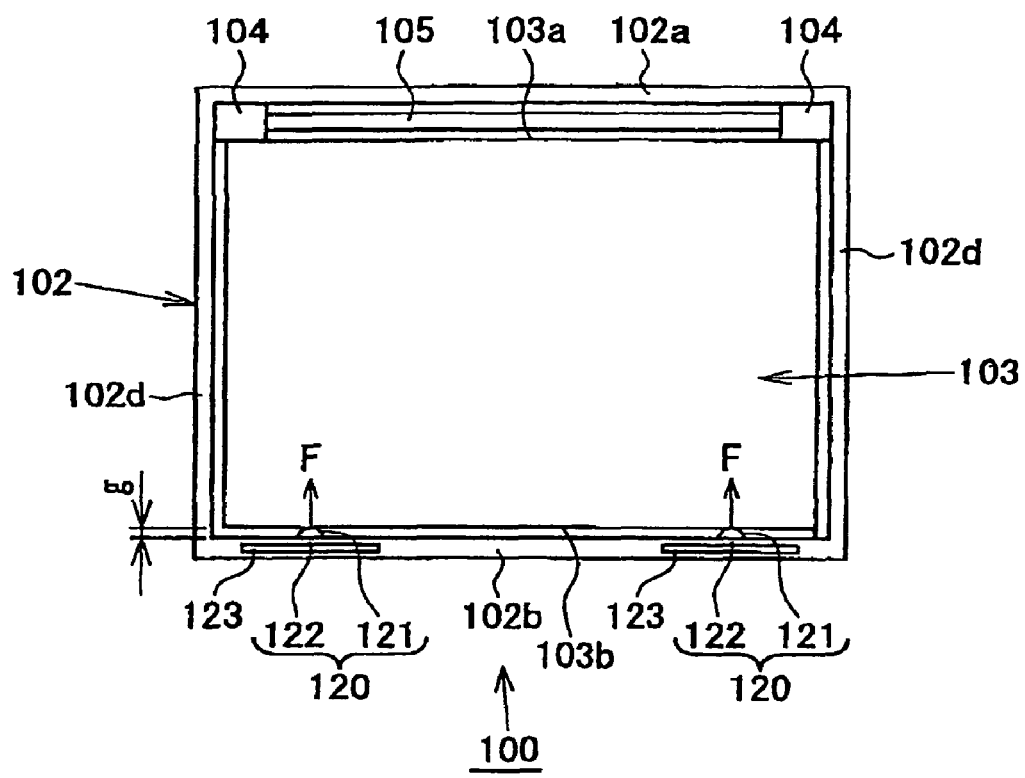
FIG. 3 is a top view illustrating a configuration example of a conventional planar illumination device.

Next, the planar illumination device in a second embodiment of the present invention will be described. FIG. 2 is a top view illustrating an essential part of the planar illumination device 30. The planar illumination device 30 in this embodiment has configuration basically similar to that of the planar illumination device 10 shown in FIG. 1, and only the configuration of the elastic action portion 33 provided at the inner frame 32 is different. Thus, description on the duplicated portions will be omitted and the configuration and actions of the elastic action portion 33 will be described in detail.

In the planar illumination device 30, the elastic action portion 33 comprises a pair of cantilever beams 33 provided at opposing two sides 32c, 32d of the inner frame 32, the cantilever beam 33 extending with inclination from each of the sides 32c, 32d of the inner frame toward a free end 33a on the open side of the inner frame 32 so as to expand outward of the inner frame 32, and at the free end (distal end), an engagement portion 33a to be engaged with upper end portions 14c, 14d of the side walls 11c, 11d of the outer frame 11 is provided.

In this embodiment, the inner frame 32 is arranged so that the elastic action portion 33 is brought into contact with the side walls 11c, 11d of the outer frame 11, and the inclination is slightly bent inward of the inner frame 32, by which a drag F directed diagonally upward in the right from the side wall 11c acts on the side 32c of the inner frame 32 as a reaction to the elastic force exerted by the elastic action portion 33 on the side wall 11c, and a drag F' directed diagonally upward in the left from the side wall 11d acts on the side 32d of the inner frame 32 as a reaction to the elastic force exerted by the elastic action portion 33 on the side wall 11d. In this embodiment, the inner frame 32 and the light guide plate 13 are energized by an upward component $F_U$ of the drags F, F' toward the point-like light source 15 with the respective horizontal components $F_R$, $F_L$ acting at the same time, which stably hold the inner frame 32 at the outer frame 11. Similarly, the expansion/contraction in the vertical direction and the horizontal direction of the light guide plate 13 caused by fluctuation in the ambient temperature or the like is absorbed by fluctuation in the inclination of the elastic action portion 33 outward or inward of the inner frame 32. The planar illumination device 30 obtains the same actions/effects as those of the planar illumination device 10 in the above-mentioned first embodiment by the pair of elastic action portions 33 provided at the opposing two sides 32c, 32d of the inner frame 32.

The invention claimed is:

1. A planar illumination device comprising:
a light guide plate;
point-like light sources arranged on a side end face of the light guide plate; and
a frame holding the light guide plate and the point-like light sources, wherein
the flame comprises an inner frame formed substantially in a U-shape in a plane of the light guide plate, and an outer frame having a plate-state seat portion and a plurality of side walls installed upright on an outer edge portion of the seat portion so as to accommodate the inner flame;
the light guide plate is accommodated in the inner frame and mounted on the seat portion together with the inner frame;
the point-like light source is held between the side end face on an open side of the inner flame in the light guide plate and at least one of the plurality of side walls of the outer flame that is opposite the side end face;
an inner face side of each side constituting the inner flame is formed in a shape according to each side end face of the light guide plate, and on an outer face side of at least one of the sides constituting the inner flame, an elastic action portion is provided that is elastically deformed by making partial contact with at least one of the plurality of side walls of the outer flame and energizing the light guide plate toward the point-like light source;
all of the inner face sides constituting the inner flame are in surface contact with the side end faces of the light guide plate; and
the elastic action portion is provided on one side of the inner flame opposite the open side of the inner frame and comprises a thin beam portion and a projection portion projecting outward of the inner frame substantially from the center of the beam portion toward the outer frame, and the inner frame is accommodated in the outer frame with the projection portion in contact with at least one of the plurality of side walls of the outer frame.

2. The planar illumination device according to claim 1, wherein the inner frame is formed from a white resin material and the outer frame is formed from a heat conductive metal material.

3. The planar illumination device according to claim 1, wherein the elastic action portion is further provided at opposing two sides of the inner frame.

4. The planar illumination device according to claim 3, wherein the inner frame is formed from a white resin material and the outer frame is formed from a heat conductive metal material.

* * * * *